United States Patent [19]

O'Dell et al.

[11] Patent Number: 5,803,803

[45] Date of Patent: Sep. 8, 1998

[54] SWITCHGEAR WITH IMPROVED VENTILATION

[75] Inventors: Michael P. O'Dell, Oak Park; Phillip J. Fahey, Evanston, both of Ill.

[73] Assignee: S&C Electric Company, Chicago, Ill.

[21] Appl. No.: 777,913

[22] Filed: Dec. 23, 1996

[51] Int. Cl.$^6$ ...................................................... H05K 5/00
[52] U.S. Cl. ........................... 454/184; 174/50; 174/16.1
[58] Field of Search ........................... 454/184; 174/16.1, 174/50

[56] References Cited

U.S. PATENT DOCUMENTS

| | | | |
|---|---|---|---|
| 4,644,443 | 2/1987 | Swensen et al. | 174/16.1 |
| 4,672,509 | 6/1987 | Speraw | 174/16.1 |
| 4,897,762 | 1/1990 | Daikoku et al. | 174/16.1 |
| 5,193,049 | 3/1993 | Jackson | 361/379 |
| 5,578,792 | 11/1996 | Devonald, III et al. | 174/50 |

*Primary Examiner*—Harold Joyce
*Assistant Examiner*—Devek S. Boles
*Attorney, Agent, or Firm*—James V. Lapacek

[57] ABSTRACT

An arrangement capable of being assembled with either an existing installed electrical equipment enclosure or during the fabrication and assembly of the electrical equipment enclosure is provided that increases the ventilation characteristics of the electrical equipment enclosure and provides desirable tamper resistance. The electrical equipment enclosure includes at least one sidewall, at least one access panel carried by the sidewall, at least one support member spanning portions of the sidewall, and a roof being carried above the sidewall and the access panel. The sidewall, the access panel, the roof and the support member including predetermined turned edges forming flanges and being assembled so as to define predetermined passageways therebetween which provide predetermined ventilation characteristics and tamper resistance characteristics. The arrangement includes features for increasing the spacing of the roof from the sidewall and the support member when assembled with the electrical equipment enclosure and facilities for affixing to the support member and extending along and therefrom to resist tampering via the forming of a wire trap. In a specific arrangement, the roof includes threaded studs extending therefrom which extend through the support member to fasten the roof. For field retrofit installation, the spacing feature is provided by a spacer/extender member that includes a widened base portion and a sleeve portion having internal and external threads, the internal threads threadingly receiving the roof studs.

8 Claims, 7 Drawing Sheets

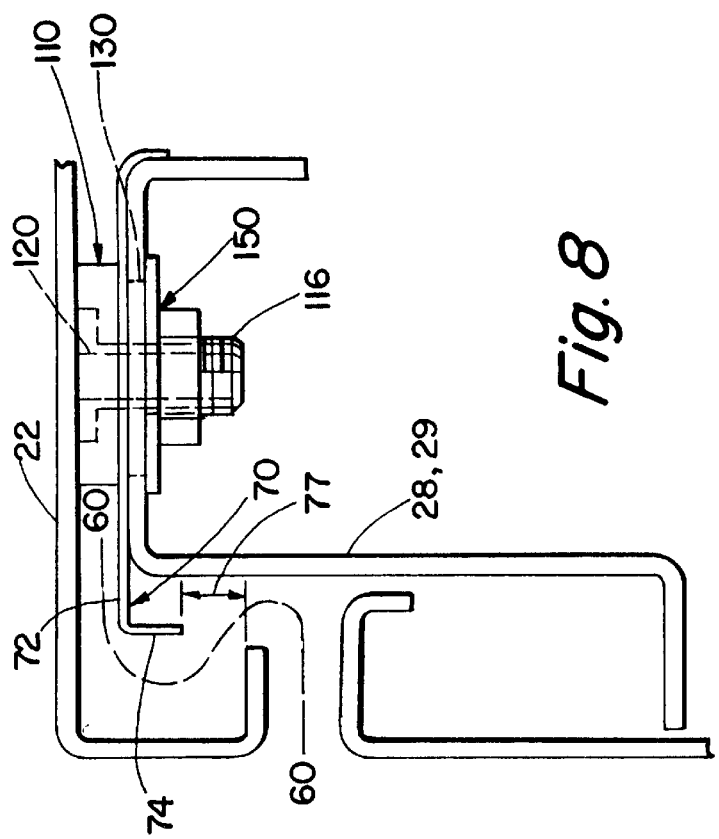
Fig. 8
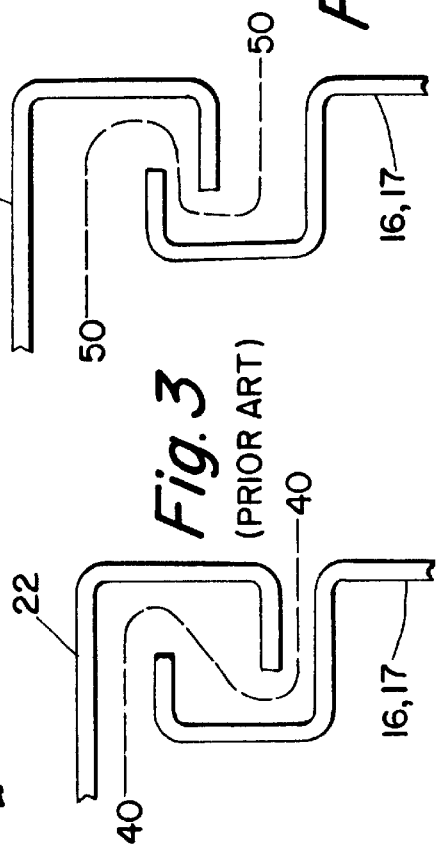
Fig. 7
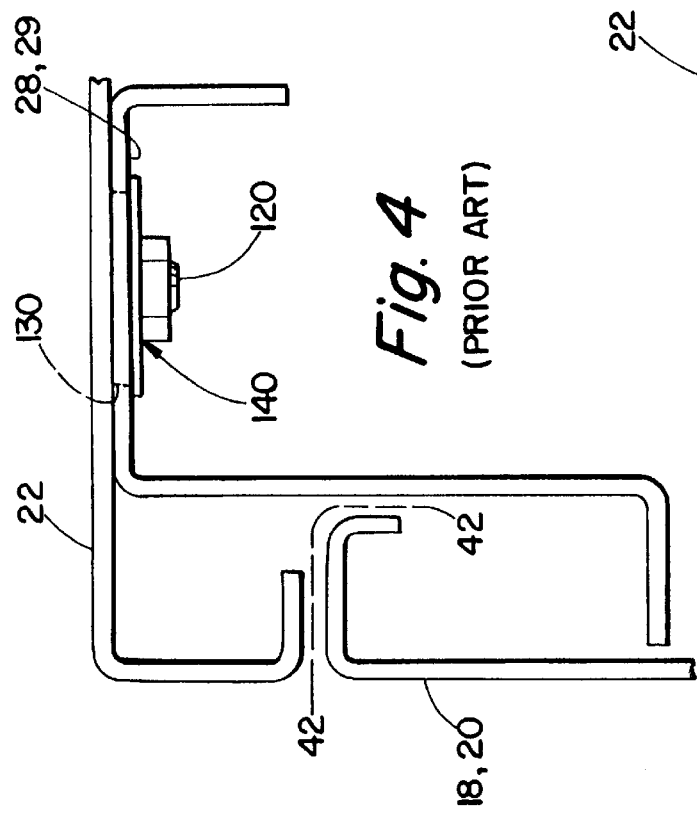
Fig. 4 (PRIOR ART)
Fig. 3 (PRIOR ART)

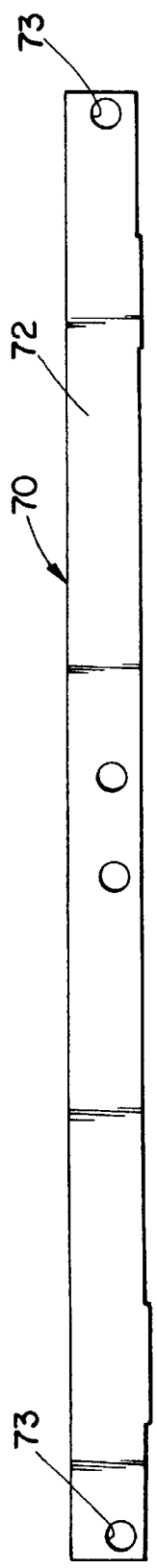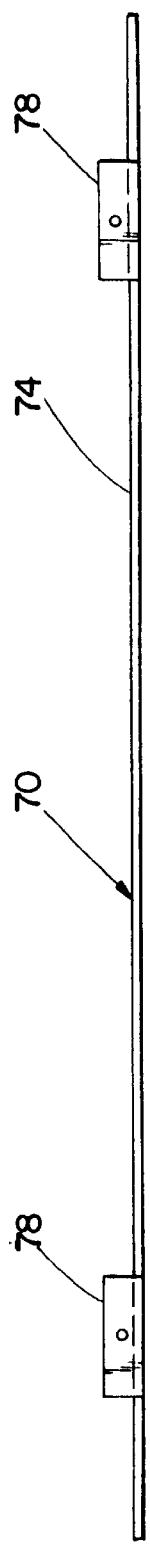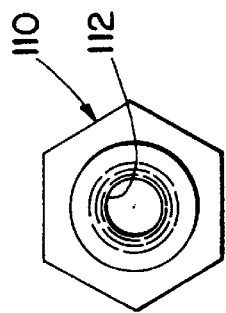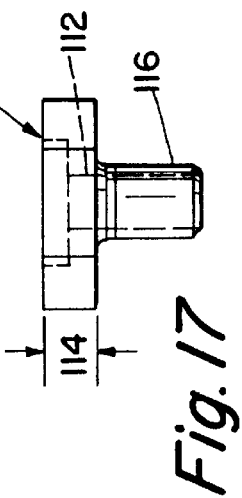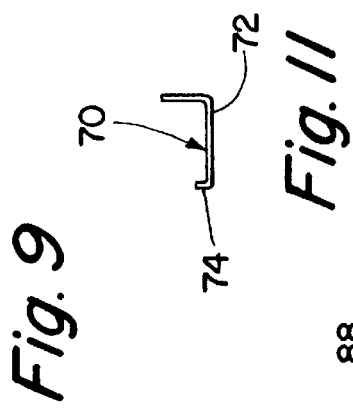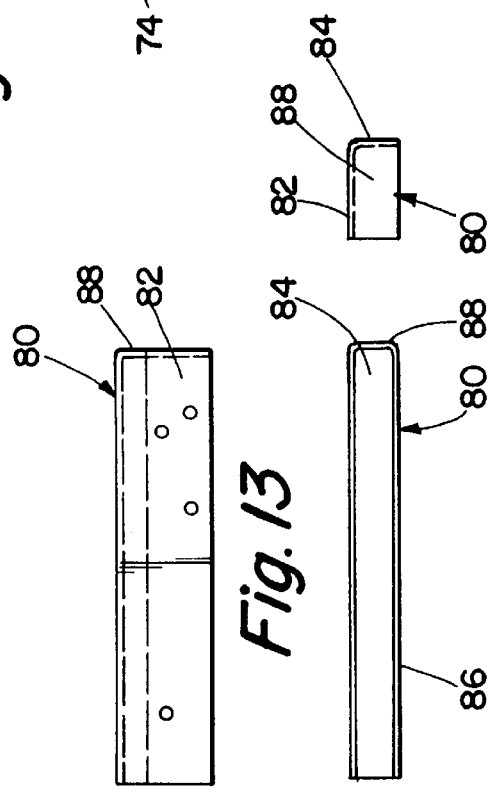

SWITCHGEAR WITH IMPROVED VENTILATION

BACKGROUND OF THE INVENTION

1. Field of the Invention

The present invention relates generally to switchgear for the field of electrical power distribution, and more particularly to pad-mounted switchgear having improved structure and configuration to provide increased ventilation while maintaining desirable tamper resistance to wire probes and the like.

2. Description of the Related Art

Pad-mounted switchgear is utilized in the electrical power distribution system for housing cable terminations, electrical switches and circuit protection components such as fuses. Referring now to FIGS. 1–4, an exemplary pad-mounted switchgear 12 includes an enclosure 14, which, for illustrative purposes is fabricated from sheets or panels forming sidewalls 16, 17, access doors 18,20, a roof 22, and support members such as channels 24, 26, 28, 29, 30 and 32 and brackets 25, 27 illustrated in FIG. 2. The component parts are assembled, e.g. via fasteners or welding, to provide an enclosure 14 with structural integrity and desirable tamper-resistant characteristics. Since this type of switchgear is typically located in publicly accessible areas, ventilation is provided by means of spacing between the various component parts of the housing. To this end, the panels or sheets 16,17 are formed with turned edges so as to define flanges as shown in FIGS. 3 and 4, these panels meeting at the roof 22 so as to define predetermined spaces for providing the desirable ventilation characteristics. For example, FIGS. 1 and 2 illustrate the basic structure and construction of this type of pad-mounted switchgear and FIGS. 3 and 4 illustrate the ventilation openings and passageways provided by this construction technique. The passageway formed between the side sheet 16,17 and the roof 22 is generally referred to at 40—40 in FIG. 3 and the opening defined between the roof 22 and door panels 18,20 is generally referred to at 42—42 in FIG. 4. Referring additionally to FIGS. 5 and 6, a corner guard 43 is provided at each top corner 54,58 as will be explained in more detail hereinafter. A corner guard 43', which is the mirror image of the corner guard 43 is provided at each top corner 52,56.

While this and other prior art arrangements may be useful to provide pad-mounted switchgear with desirable ventilation characteristics while also providing desirable tamper resistance, in some environments increased ventilation would be desirable.

SUMMARY OF THE INVENTION

Accordingly, it is a principal object of the present invention to provide pad-mounted switchgear with increased ventilation while maintaining desirable tamper resistant characteristics.

It is another object of the present invention to provide a kit of component parts for the field retrofit of pad-mounted switchgear to increase the ventilation characteristics and maintain desirable tamper resistance.

These and other objects of the present invention are efficiently achieved by an arrangement capable of being assembled with either an existing installed electrical equipment enclosure or during the fabrication and assembly of the electrical equipment enclosure that increases the ventilation characteristics of the electrical equipment enclosure and provides desirable tamper resistance. The electrical equipment enclosure includes at least one sidewall, at least one access panel carried by the sidewall, at least one support member spanning portions of the sidewall, and a roof being carried above the sidewall and the access panel. The sidewall, the access panel, the roof and the support member including predetermined turned edges forming flanges and being assembled so as to define predetermined passageways therebetween which provide predetermined ventilation characteristics and tamper resistance characteristics. The arrangement includes features for increasing the spacing of the roof from the sidewall and the support member when assembled with the electrical equipment enclosure and facilities for affixing to the support member and extending along and therefrom to resist tampering via the forming of a wire trap. In a specific arrangement, the roof includes threaded studs extending therefrom which extend through the support member to fasten the roof. For field retrofit installation, the spacing feature is provided by a spacer/extender member that includes a widened base portion and a sleeve portion having internal and external threads, the internal threads threadingly receiving the roof studs.

BRIEF DESCRIPTION OF THE DRAWING

The invention, both as to its organization and method of operation, together with further objects and advantages thereof, will best be understood by reference to the specification taken in conjunction with the accompanying drawing in which:

FIGS. 3 and 4 are partial sectional views of the pad-mounted switchgear of FIG. 1 illustrating assembly, ventilation pathway configuration, and tamper resistance;

FIGS. 7 and 8 are partial sectional views of the arrangement of the present invention illustrating assembly, ventilation pathway configuration, and tamper resistance;

FIG. 9–11 are respective front, top plan and left-side elevational views of a front guard member of the arrangement of FIGS. 7 and 8;

FIGS. 12–14 are respective front, top plan, and right-side elevational views of a corner guard of the arrangement of FIGS. 7 and 8;

FIGS. 17 and 18 are respective front elevational and top plan views of a spacer/extender member utilized with field retrofit installation of the arrangement of the present invention;

DETAILED DESCRIPTION

Figure 1:
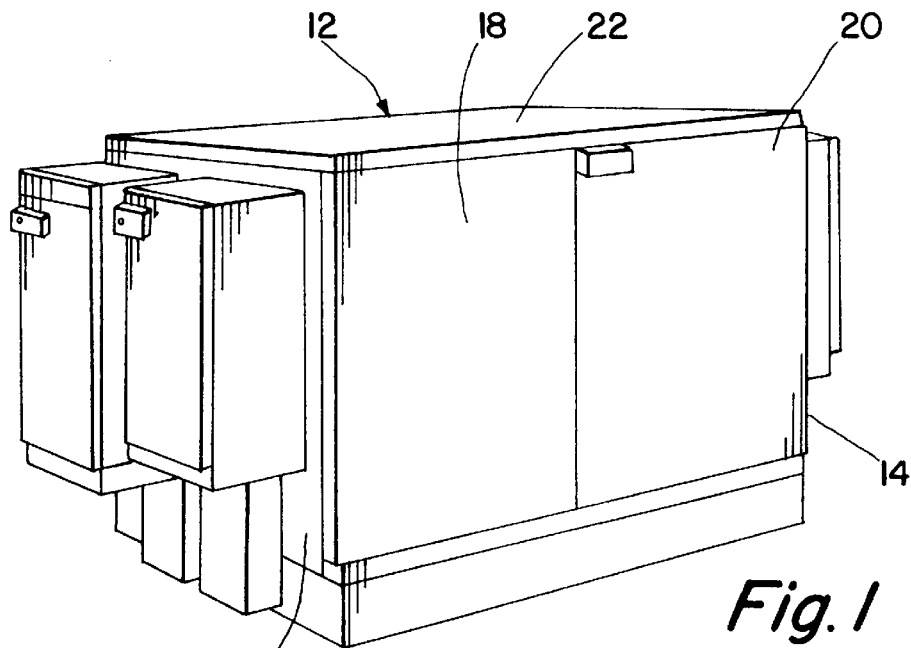
FIG. 1 is a perspective view of pad-mounted switchgear of the prior art.
Figure 2:
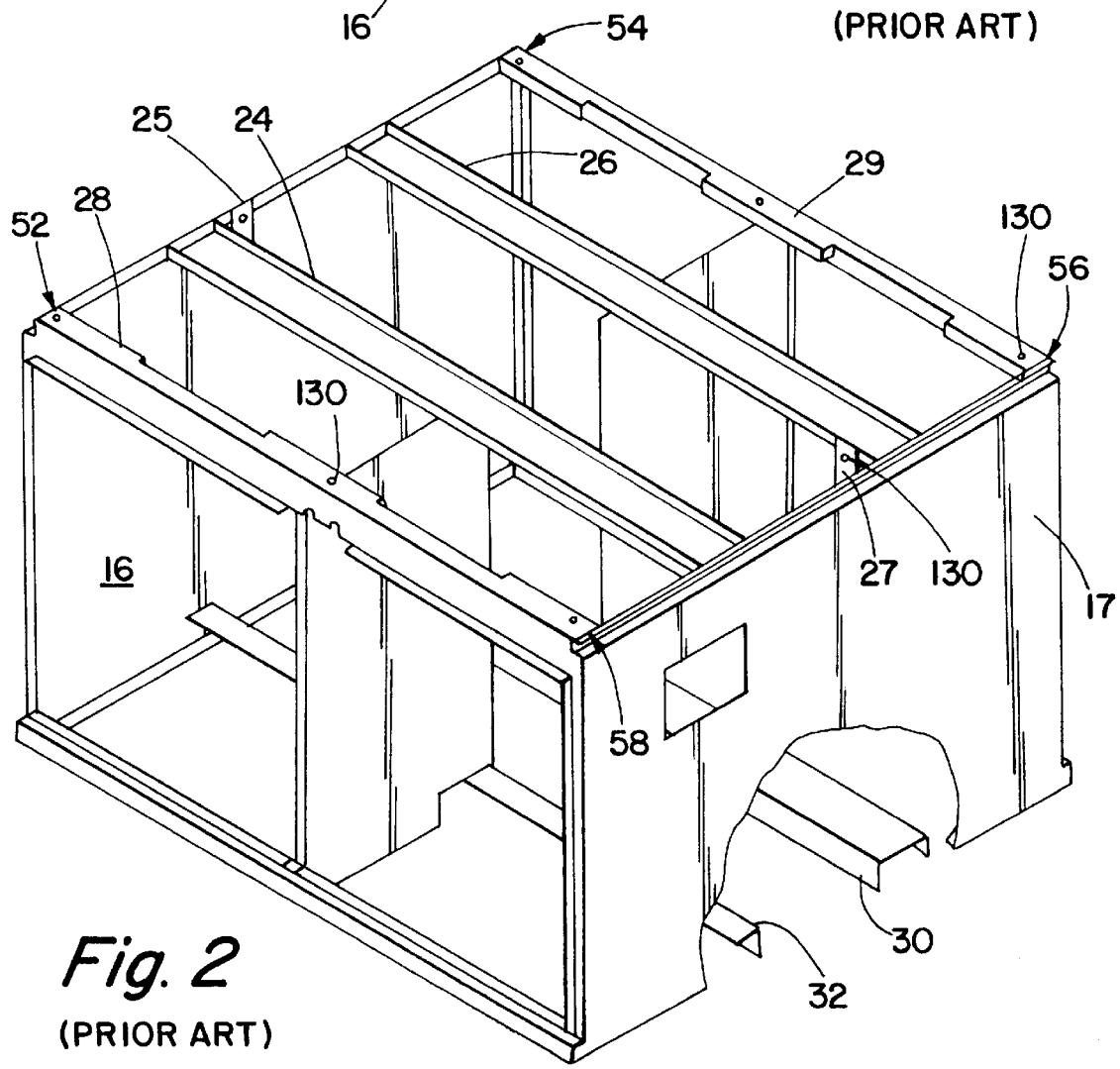
FIG. 2 is a perspective view with parts removed of the enclosure of the pad-mounted switchgear of FIG. 1.
Figure 5:
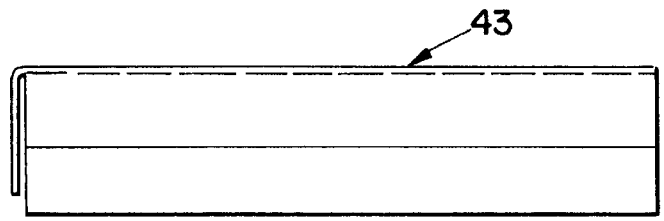
FIGS. 5 and 6 are respective front and left-side elevational views of a corner guard of the pad-mounted switchgear of FIGS. 1–4.
Figure 6:
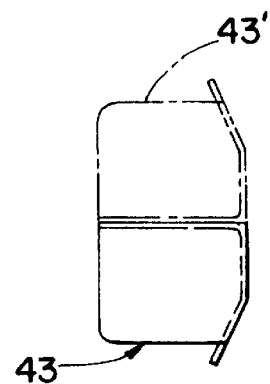
Figure 15:
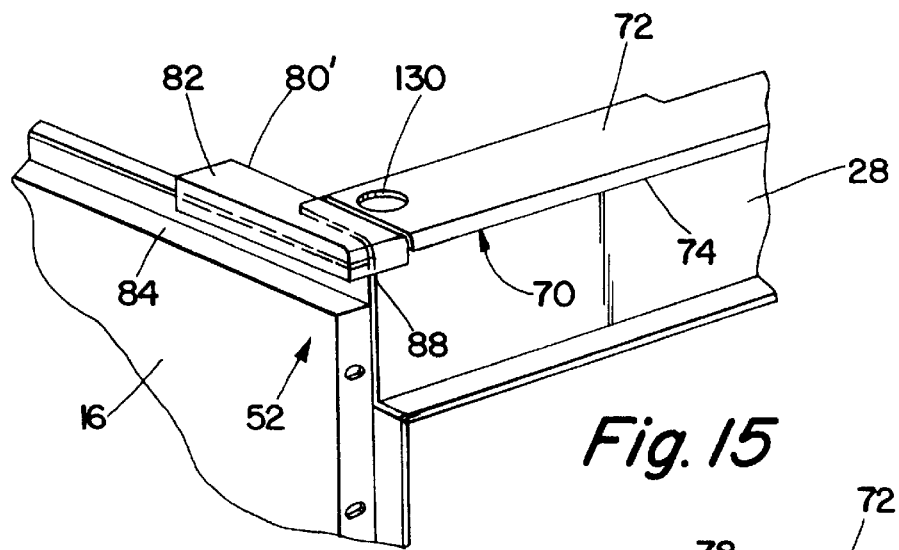
FIGS. 15 and 16 are partial perspective views of the pad-mounted switchgear of FIG. 2 and illustrating the arrangement of the present invention as installed.
Figure 16:
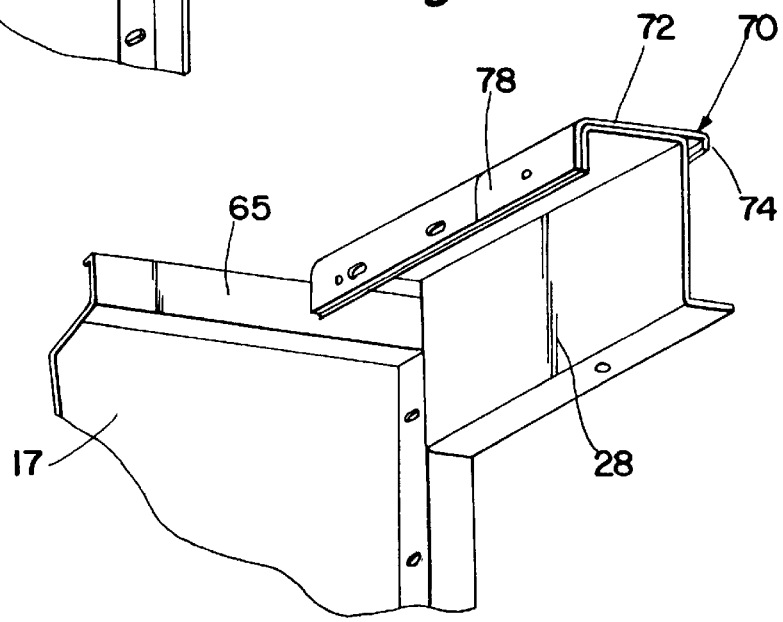

Referring now additionally to FIGS. 7 and 8 and in accordance with important aspects of the present invention to improve the ventilation of the pad-mounted switchgear 12, the pad-mounted switchgear 12 of FIGS. 1–6 may be modified to provide a modified passageway 50—50 between the side sheets 16, 17 and the roof 22 as illustrated in FIG. 7 and a modified passageway 60—60 as illustrated in FIG. 8 between the doors 18, 20, the roof 22, and the channel members 28, 29 that function as top rails. This modification may be performed either as a field retrofit via a kit of component parts or in a manufacturing environment during the fabrication and assembly of the pad-mounted switchgear 12. The improved, modified passageways 50—50 and 60—60 are provided by increasing the separation between the roof 22 and the lower components such as the channel members 24, 26, 28 and 29 and the brackets 25, 27 to which the roof 22 is attached. Additionally, and referring now additionally to FIGS. 9–11, to achieve at least as much tamper resistance as with the unmodified, conventional switchgear, a front guard member 70 (FIG. 8) is provided extending from the top of each of the channel members 28,29 that serve as and are also referred to as top rails 28, 29. In cooperation with the front guard member 70, and referring additionally to FIGS. 12–16, a corner guard 80 is provided at the top corners 54,58 (FIG. 2) of the enclosure 12 where the sidewalls 16, 17 meet the top rails 28, 29. A corner guard 80', as shown in FIG. 15, is also provided at the top corners 52,56, the corner guard 80' being a mirror image part of the corner guard 80. The placement of the front guard member 70 is also illustrated in FIGS. 15–16. The front guard 70 is effective when installed to define a desirable path characteristic at 77 of the passageway 60—60 as seen in FIG. 8. Specifically, the front guard 70 includes a top surface 72 and a flange portion 74 extending generally at a right angle to the top surface 72. The top surface 72 extends along the expanse of the top rails 28,29 and beyond the front edge of each of the top rails 28, 29 so as to define the path dimension 77 in combination with the downwardly extending flange portion 74. The front guard 70 is affixed to the vertical surface of the top rails 28, 29 via flange portions 78 Apertures 73 are provided for alignment with the apertures 130 in the top rails 29, 30. Referring again now to FIGS. 12–15, the corner guards 80, 80' include a top surface 82, a side surface 84, a lower turned-in flange 86, and a closed end 88 to provide the tamper resistance features.

Considering now a specific embodiment that is useful for field retrofit of assembled switchgear and referring now additionally to FIGS. 17–18, an illustrative spacer/extender element 110 is useful where the roof 22 is attached, as shown in FIG. 4, via threaded studs 120 affixed to and extending from the underside of the roof 22 and through holes 130 in the channels 24, 29 and the brackets 25, 27, and cooperating with fasteners/washers 140 which are threaded onto the studs 120 extending below the channel members 24, 26, 28 and 29. Referring now to FIG. 8, to modify the pad-mounted switchgear 12, the roof 22 is removed and the spacer/extender element 110 is threaded over the stud 120 via a central threaded passage 112. The corner guards 43,43' are removed, and the corner guards 80,80' and the front guards 70 are installed. The roof 22 is then installed.

The height 114 of the upper widened portion of the spacer/extender element 110 determines the increase in the separation between the roof 22 and the channel members 24, 26, 28 and 29 and the brackets 25, 27. The spacer/extender element 110 also includes a threaded stud portion 116 which extends through the hole 130 in the channel members 24, 29, and the brackets 25, 27, with fasteners/washers 150 being threaded over the studs 116 to fasten the roof 22 to the channel members 24, 26, 28 and 29.

Figure 19:
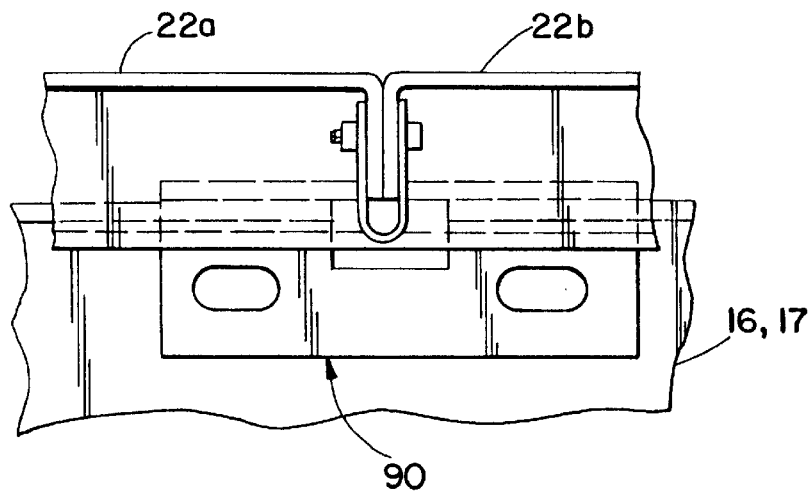
FIGS. 19 and 20 are partial sectional views illustrating a specific roof structure to which the arrangement of the present invention is applicable and illustrating a roof guard for such use.
Figure 20:
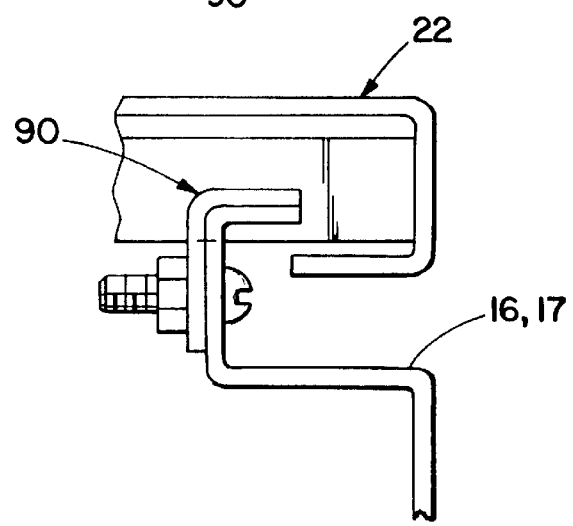
Figure 22:
FIGS. 21–23 are respective front elevational, top plan, and right-side elevational views of the roof guard illustrated in FIGS. 19 and 20.
Figure 24:
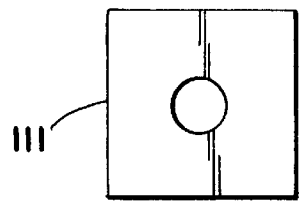
FIGS. 24 and 25 are respective front and right-side elevational views of a spacer member useful in a specific embodiment of the present invention for manufacture of pad-mounted switchgear.
Figure 21:
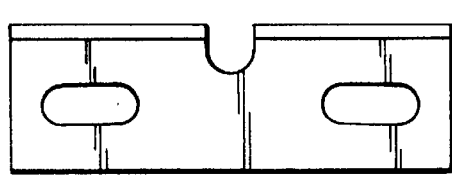
Figure 23:
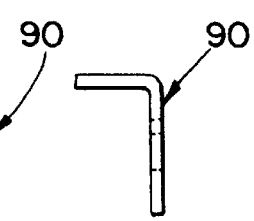
Figure 25:
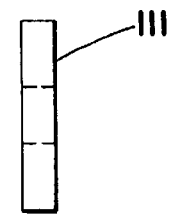
Figure 26:
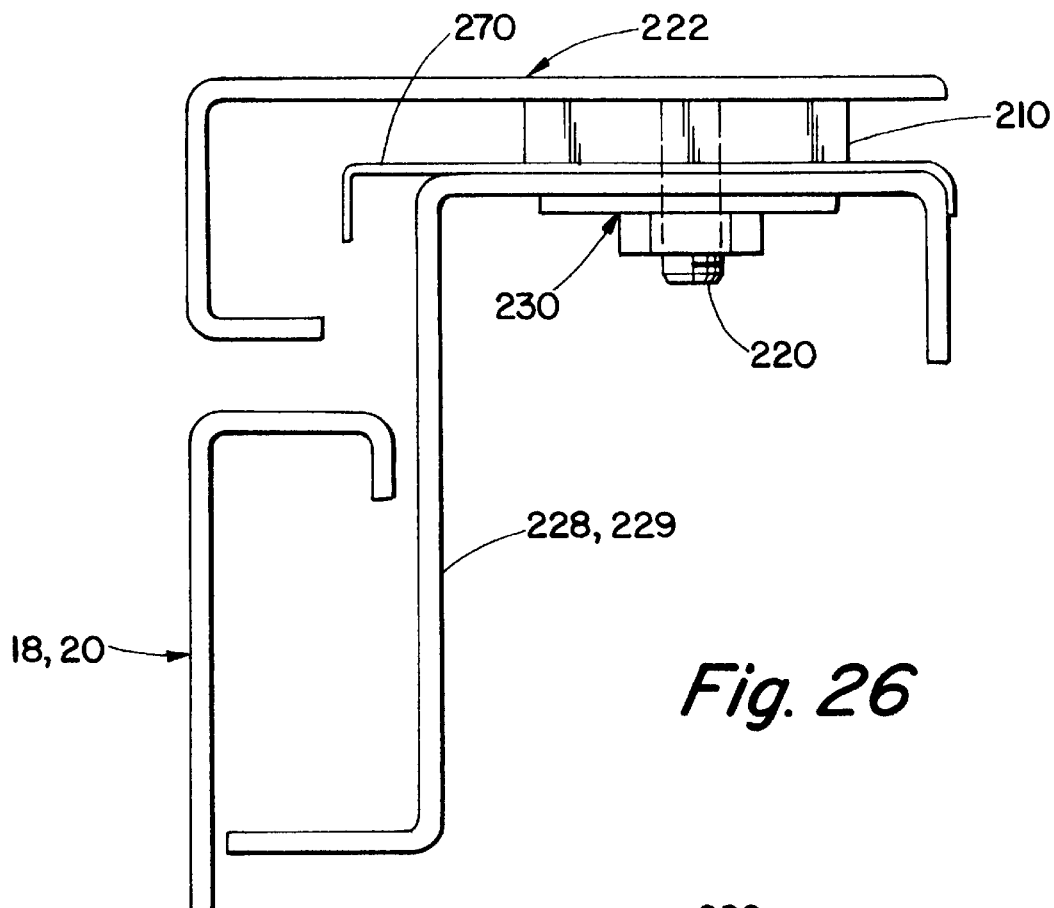
FIGS. 26 and 27 are partial sectional views of a second embodiment of the arrangement of the present invention useful in manufacture of pad-mounted switchgear and illustrating assembly, ventilation pathway configuration, and tamper resistance.

Considering a specific embodiment for implementation during fabrication rather than for field retrofit of assembled switchgear, and referring now additionally to FIGS. 24–25, in lieu of the spacer/extender element 110, studs 120 of the appropriate length, e.g. as shown in FIGS. 8 and 17, are utilized along with spacer elements, e.g. spacer 111 of FIGS. 24–25.

Where the roof 22 of the pad-mounted switchgear 12 is a two-piece component (referred to as a split-roof construction), and referring now additionally to FIGS. 19–23, a roof guard 90 is attached to the sidewall 16, 17 as shown in FIGS. 19–20, the details of the roof guard 90 are best seen in FIGS. 21–23.

Figure 27:
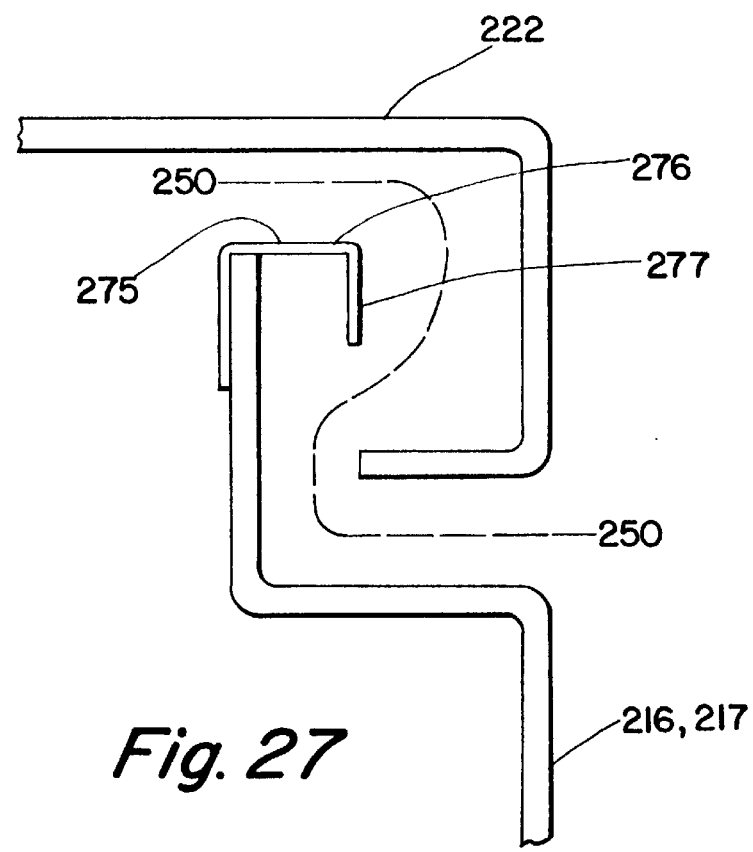
Figure 29:
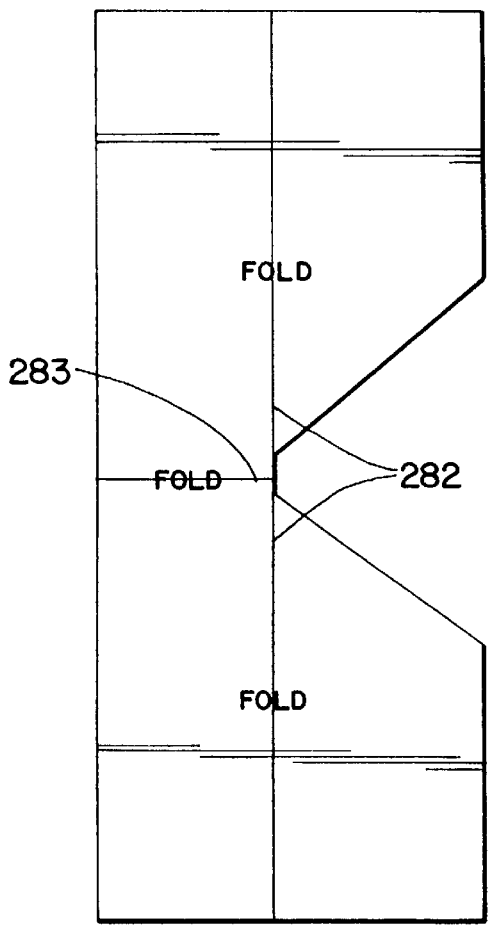
FIG. 29 is a top plan view of a corner guard member of the arrangement of FIGS. 26–27 before fabrication.
Figure 30:
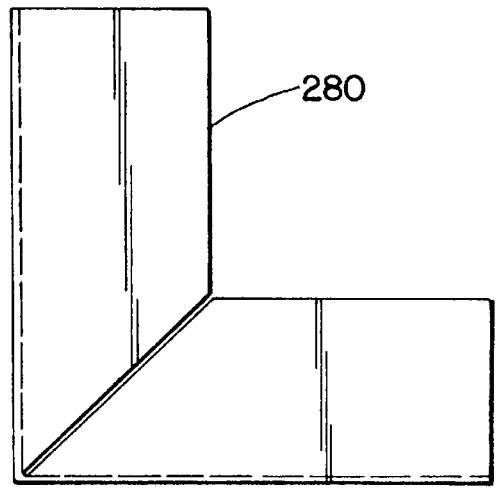
FIG. 30 is a top plan view of the corner guard of FIG. 29 after fabrication.
Figure 31:
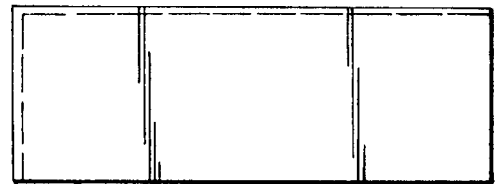
FIG. 31 is a front elevational view of the corner guard of FIG. 30.
Figure 28:
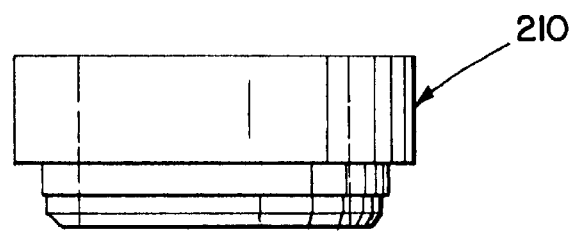
FIG. 28 is a front elevational view of a spacer member useful in the arrangement of FIGS. 26 and 27.

Considering another embodiment of the present invention useful during fabrication of pad-mounted switchgear enclosures and referring now additionally to FIGS. 26–31, the height of the side sheets 216, 217 are increased (FIG. 27) and a side guard 275 is provided as shown in FIG. 27. This feature further increases the air flow capabilities via a defined passageway 250—250. Further, the horizontally extending flange at the top of the side sheets 16,17 is eliminated from the side sheets 216,217. A surface 276 of the side guard 275 is arranged to provide that function and the surface 277 of the side guard 275 provides a wire-probe blocking function. A corner guard 280 is provided as shown in FIGS. 29–31, the corner guard 280 being formed from a planar member 281 via folding operations along lines 282 and 283. Spacers 210 (FIGS. 26 and 28) and studs 220 extending from the roof 222, of sufficient length to pass through the top rails 228,229 are utilized along with fasteners/washers 230 to secure the roof 222 at the appropriate position. Of course, it should be realized that the spacer 210 is merely illustrative and that the spacer 111 of FIGS. 24–25 is also useful in specific embodiments. A front guard 270 (FIG. 26), similar to the front guard 70, is provided along the top rails 228,229 to define a surface 271 that provides a wire probe blocking function. This embodiment is useful in applications where further increases in ventilation are desirable and the combination of the side sheets 216,217 and the side guard 275 represent the most expedient and efficient manufacturing process.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. A kit of component parts capable of being assembled with either an existing installed electrical equipment enclosure or during the fabrication and assembly of the electrical equipment enclosure to increase the ventilation characteristics of the electrical equipment enclosure while maintaining desirable tamper resistance characteristics, the electrical equipment enclosure being defined by at least one sidewall, at least one access panel carried by the at least one sidewall, at least one support member spanning portions of the at least one sidewall, and a roof being carried above the at least one sidewall and the at least one access panel, the roof defining a roof perimeter; the at least one sidewall, the at least one access panel, the roof and the at least one support member including predetermined turned edges forming flanges and being assembled so as to define predetermined passageways therebetween which provide predetermined ventilation characteristics and tamper resistance characteristics, the kit comprising:

spacing means for increasing the spacing of the roof from the at least one sidewall and the at least one support member when assembled with the electrical equipment enclosure; and first means for affixing to the support member and extending along and therefrom to resist tampering, said first means comprising a generally planar member affixed to the at least one support member and being adapted to extend beyond the at least one support member toward the roof perimeter, said first means further comprising a flange extending downwardly from said generally planar member at approximately a right angle thereto.

2. An electrical equipment enclosure being defined by at least one sidewall, at least one access panel carried by the at least one sidewall, at least one support member spanning portions of the at least one sidewall, and a roof being carried above the at least one sidewall and the at least one access panel, the roof defining a roof perimeter; the at least one sidewall, the at least one access panel, the roof and the at least one support member including predetermined turned edges forming flanges and being assembled so as to define predetermined passageways therebetween which provide predetermined ventilation characteristics and tamper resistance characteristics, wherein the improvement comprises an arrangement for increasing the ventilation characteristics and maintaining the tamper resistance characteristics, the arrangement comprising spacing means for increasing the spacing of the roof from the at least one sidewall and the at least one support member when assembled with the electrical equipment enclosure and first means for affixing to the support member and extending along and therefrom to resist tampering, said first means comprising a guard member adapted for affixing to the at least one support member and defining a wire trap between the at least one support member and the roof.

3. A method for field retrofit of an existing electrical equipment enclosure to increase the ventilation characteristics of the electrical equipment enclosure while maintaining desirable tamper resistance characteristics, the electrical equipment enclosure being defined by at least one sidewall, at least one access panel carried by the at least one sidewall, at least one support member spanning portions of the at least one sidewall, and a roof being carried above the at least one sidewall and the at least one access panel, the roof defining a roof perimeter; the at least one sidewall, the at least one access panel, the roof and the at least one support member including predetermined turned edges forming flanges and being assembled so as to define predetermined passageways therebetween which provide predetermined ventilation characteristics and tamper resistance characteristics, the roof including threaded studs extending therefrom which extend through the at least one support member to fasten the roof to the at least one support member, the method comprising the steps of:

removing the roof;

adding spacers over the threaded studs of the roof, the spacers increasing the space between the roof and the at least one support member, the spacers including internal threads for threadingly receiving the roof studs and extending externally threaded spacer studs disposed through the at least one support member; and reassembling the roof to the electrical equipment enclosure via the affixing of the spacer studs to the at least one support member.

4. The method of claim 3 further comprising before reassembling the roof, the step of affixing guard members to the at least one support member that provide wire trap structure.

5. A kit of component parts capable of being assembled with either an existing installed electrical equipment enclosure or during the fabrication and assembly of the electrical equipment enclosure to increase the ventilation characteristics of the electrical equipment enclosure while maintaining desirable tamper resistance characteristics, the electrical equipment enclosure being defined by at least one sidewall, at least one access panel carried by the at least one sidewall, at least one support member spanning portions of the at least one sidewall, and a roof being carried above the at least one sidewall and the at least one access panel, the roof defining a roof perimeter and including studs which extend through the at least one support member to fasten the roof to the at least one support member, the at least one sidewall, the at least one access panel, the roof and the at least one support member including predetermined turned edges forming flanges and being assembled so as to define predetermined passageways therebetween which provide predetermined ventilation characteristics and tamper resistance characteristics, the kit comprising:

spacing means for increasing the spacing of the roof from the at least one sidewall and the at least one support member when assembled with the electrical equipment enclosure; and first means for affixing to the support member and extending along and therefrom to resist tampering, said spacing means comprising a plurality of second means for spacing the roof from the at least one support member, threadingly receiving the studs, and providing a threaded portion to extend through the at least one support member, said second means comprising a plurality of sleeve members having a widened base portion and internal and external threads.

6. The kit of component parts of claim 5 wherein said first means comprises a guard member adapted for affixing to the at least one support member and defining a wire trap between the at least one support member and the roof.

7. An electrical equipment enclosure being defined by at least one sidewall, at least one access panel carried by the at least one sidewall, at least one support member spanning portions of the at least one sidewall, and a roof being carried above the at least one sidewall and the at least one access panel, the roof defining a roof perimeter; the at least one sidewall, the at least one access panel, the roof and the at least one support member including predetermined turned edges forming flanges and being assembled so as to define predetermined passageways therebetween which provide predetermined ventilation characteristics and tamper resistance characteristics, wherein the improvement comprises an arrangement for increasing the ventilation characteristics and maintaining the tamper resistance characteristics, the arrangement comprising spacing means for increasing the spacing of the roof from the at least one sidewall and the at least one support member when assembled with the electrical equipment enclosure and first means for affixing to the support member and extending along and therefrom to resist tampering, said first means comprising a generally planar member affixed to the at least one support member and being adapted to extend beyond the at least one support member toward the roof perimeter, said first means further comprising a flange extending downwardly from said generally planar member at approximately a right angle thereto.

8. An electrical equipment enclosure being defined by at least one sidewall, at least one access panel carried by the at least one sidewall, at least one support member spanning portions of the at least one sidewall, and a roof being carried above the at least one sidewall and the at least one access panel, the roof defining a roof perimeter and studs which extend through the at least one support member to fasten the roof to the at least one support member the at least one sidewall, the at least one access panel, the roof and the at least one support member including predetermined turned edges forming flanges and being assembled so as to define predetermined passageways therebetween which provide predetermined ventilation characteristics and tamper resistance characteristics, wherein the improvement comprises an arrangement for increasing the ventilation characteristics and maintaining the tamper resistance characteristics, the arrangement comprising spacing means for increasing the spacing of the roof from the at least one sidewall and the at least one support member when assembled with the electrical equipment enclosure and first means for affixing to the support member and extending along and therefrom to resist tampering, said spacing means comprising a plurality of spacer members, each of said spacer members including a generally central aperture for passage of the stud, one of said spacer members being provided for each stud of the roof.

* * * * *